United States Patent [19]

Kazerooni

[11] Patent Number: 4,775,289
[45] Date of Patent: Oct. 4, 1988

[54] STATICALLY-BALANCED DIRECT-DRIVE ROBOT ARM

[75] Inventor: Homayoon Kazerooni, Minneapolis, Minn.

[73] Assignee: Regents of the University of Minnesota, Minneapolis, Minn.

[21] Appl. No.: 100,929

[22] Filed: Sep. 25, 1987

[51] Int. Cl.[4] .......................... B25J 9/04; B25J 18/00
[52] U.S. Cl. ............................... 414/735; 414/744 R; 414/917; 901/18; 901/48
[58] Field of Search ............... 414/735, 744 R, 744 A, 414/744 B, 744 C, 917, 719; 901/15, 18, 23–24, 48

[56] References Cited

U.S. PATENT DOCUMENTS

| | | |
|---|---|---|
| 3,721,416 | 3/1973 | Goudreau . |
| 4,140,226 | 2/1979 | Richter ............................ 901/48 X |
| 4,229,136 | 10/1980 | Panissidi . |
| 4,341,502 | 7/1982 | Makino . |
| 4,359,308 | 11/1982 | Nakajima . |
| 4,364,535 | 12/1982 | Itoh . |
| 4,383,455 | 5/1983 | Tuda . |
| 4,455,120 | 6/1984 | Richter ............................ 414/917 X |
| 4,507,043 | 3/1985 | Flatau . |
| 4,552,505 | 11/1985 | Gorman . |
| 4,648,785 | 3/1987 | Nakagawa et al. ............... 901/48 X |
| 4,659,278 | 4/1987 | Doege et al. ..................... 901/48 X |
| 4,717,303 | 1/1988 | Kawai .............................. 901/48 X |

OTHER PUBLICATIONS

Asada, H., et al., "Design of Direct-Drive Mechanical Arms, *ASME Journal of Vibration, Acoustics, Stress, and Reliability in Design,* vol. 105, Jul. 1983, pp. 312–316.
Asada, H., et al., "A Direct-Drive Manipulator Development of a High Speed Manipulator", In Brain, R., *Development in Robotics* 1984, pp. 217–226.
Asada, H., et al., "M.I.T. Direct-Drive Arm Project", *Conference Proceedings of Robots 8,* vol. 2, *Robotics International of SME,* 1984, pp. 16-10–16-21.
Asada, H. et al., "Analysis and Design of a Direct-Drive Arm with a Five-Bar-Link Parallel Drive Mechanism", *ASME Journal of Dynamic Systems, Measurement and Control,* vol. 106, no. 3, 1984, pp. 225–230.
Mahalingam, S. et al., "The Optimal Balancing of the Robotic Manipulators", *IEEE 1986 International Conf. on Robotics and Automation,* vol. 2, Apr. 1986, pp. 828–835.
Takase, K. et al., "Design and Control of a Direct-Drive Manipulator", *Proceedings of the International Symposium on Design and Synthesis,* Tokyo, Japan, Jul. 1984, pp. 347–352.
"A Precision Direct Drive Robot Arm", pp. 722–727, Proceedings 85 American Control Conference (1985), Kuwahara et al.

*Primary Examiner*—Frank E. Werner
*Assistant Examiner*—P. McCoy Smith
*Attorney, Agent, or Firm*—Merchant, Gould, Smith, Edell, Welter & Schmidt

[57] ABSTRACT

A robot (10) includes a statically-balanced direct-drive arm (14) having three degrees of freedom, all of which are independent articulated drive joints, the driving axes of two of which intersect at the center of gravity of the arm to eliminate gravity forces on the drive system without counterweights.

9 Claims, 2 Drawing Sheets

STATICALLY-BALANCED DIRECT-DRIVE ROBOT ARM

TECHNICAL FIELD

The present invention relates generally to robotics. More particularly, this invention concerns a statically-balanced direct-drive robot arm which is configured to eliminate gravity loads on the drive system so that the same or better acceleration can be achieved with smaller actuators and without overheating.

BACKGROUND ART

There has been increasing emphasis on the application of robotics technology to various industrial uses. The Robot Institute of America defines a robot as a "reprogrammable, multifunctional manipulator designed to move materials, parts, tools or specialized devices through various programmed motions for the performance of a variety of tasks". The field of robotics is a rapidly developing technological area.

Robots with serial and parallelgram-type direct drive arms have been available before. However, while direct drive arms have certain advantages, they also have some disadvantages. In direct drive arms, the shaft of the motor is connected directly to the component being driven. This eliminates the intermediate transmission or speed reducer and its static load. It also reduces mechanical backlash, cogging, friction and thus wear. Direct drive it also increases structural stiffness of the system. However, elimination of the transmission also means that the motors "see" the full inertial and gravitational forces of the system without any reduction. This, in turn, can cause overheating of the motors, even under only static loading, requiring larger motors and/or amplifiers. Reducing the weight of the mechanical components of the system is of only limited help.

U.S. Pat. No. 4,341,502 to Makino and U.S. Pat. No. 4,552,505 to Gorman show robots with direct motor drives.

The assembly robot of Makino includes an arm comprised of four links, two of which adjacent links are each connected directly to the shaft of separate drive motors.

Various counterbalance arrangements have been provided heretofore. For example, U.S. Pat. No. 3,721,416 to Goudreau shows a loading balancer including a four bar linkage, guide slots and rollers. U.S. Pat. No. 4,229,136 to Panissidi shows a programmable air pressure counterbalance system. U.S. Pat. No. 4,359,308 to Nakajima shows a counterbalance device for a laser knife wherein the centers of gravity of the manipulator and the counterbalance device are moved in the same vertical plane but in opposite, parallel directions. These approaches, however, tend to be relatively complicated and thus expensive. Moreover, these approaches add static weight to the system requiring larger actuators and causing higher dynamic loads which affect overall response and performance.

A need has thus arisen for a statically-balanced direct-drive robot arm which is designed to eliminate gravity forces on the drive system without the expense, complication and dynamic performance drawbacks of a counterbalance arrangement.

SUMMARY OF THE INVENTION

The present invention comprises a statically-balanced direct-drive robot arm which overcomes the foregoing and other difficulties associated with the prior art. In accordance with the invention, there is provided a statically-balanced direct-drive robot arm incorporating a four bar linkage. The linkage is supported at its base link for independent pivotal movement about generally vertical and horizontal axes responsive to actuators, which are preferably of the direct-drive type. The axes intersect at the center of gravity of the linkage. One actuator effects pivotal movement of the arm about the vertical axis. Another actuator effect pivotal movement of the arm about the horizontal axis. Another actuator is mounted at one end of the base link of the linkage in driving engagement with the input link for controlling pivotal movement of the output link at the other end of the base link of the linkage. The arm is supported and actuated such that the gravity terms are eliminated from the dynamic equations resulting in a balanced mechanism without counterweights, larger motors and/or amplifiers.

BRIEF DESCRIPTION OF DRAWINGS

A better understanding of the invention can be had by reference to the following Detailed Description in conjunction with the accompanying Drawings, wherein.

DETAILED DESCRIPTION

Figure 1:
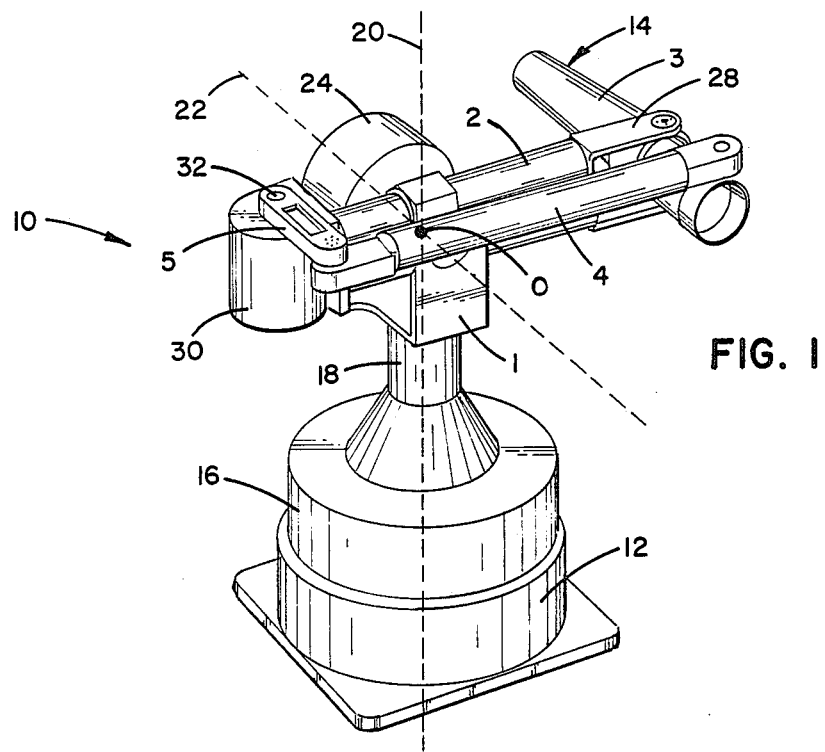
FIG. 1 is a perspective view of the statically-balanced direct-drive robot incorporating the invention.
Figure 2:
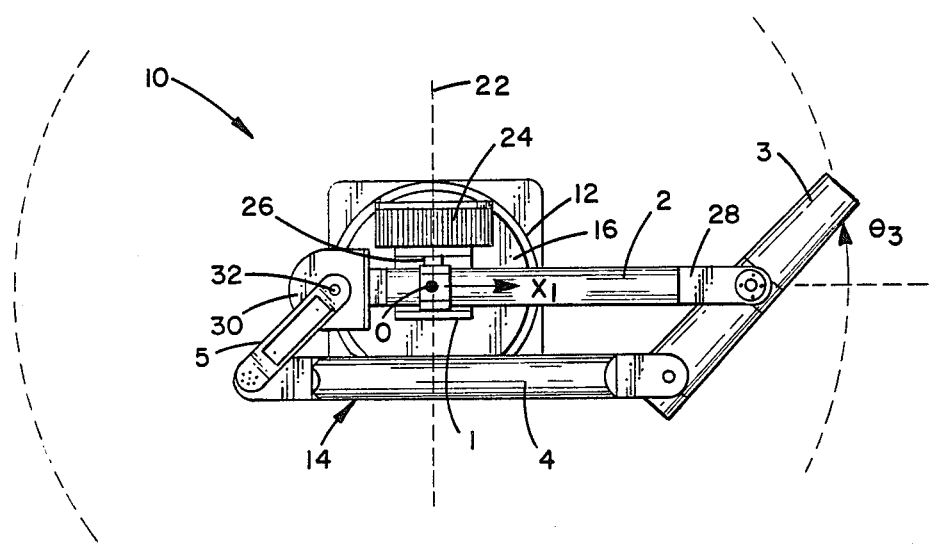
FIG. 2 is a top view.
Figure 3:
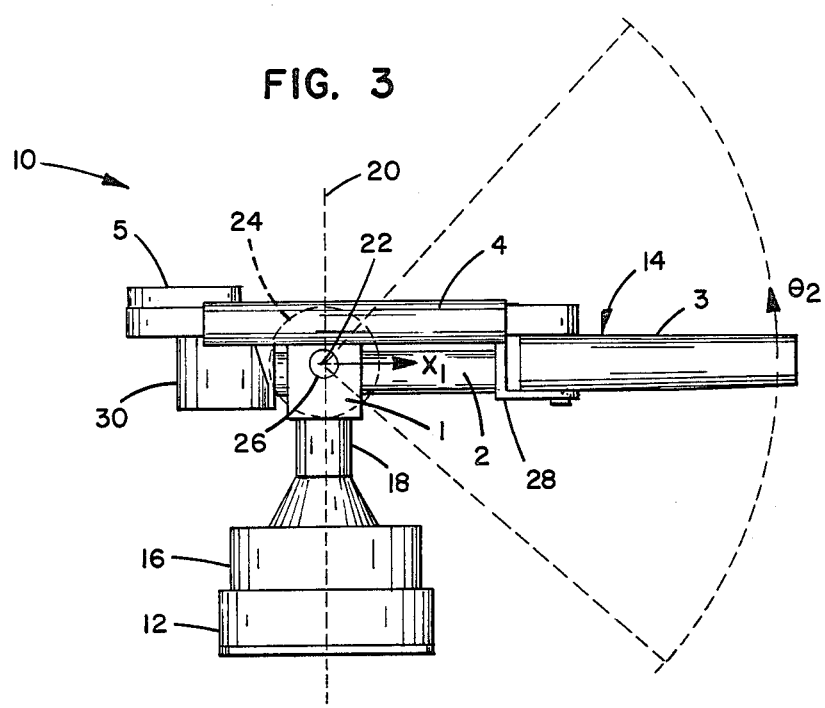
FIG. 3 is a side view.

Referring now to the Drawings, wherein like reference numerals designate like or corresponding parts throughout the views, and particularly referring to FIGS. 1-3 there is shown the robot 10 incorporating the invention. The robot 10 includes a fixed base 12 and a statically-balanced, direct-drive arm 14. The arm 14 includes a four bar linkage. The arm 14 is supported and driven by three actuators in a way which achieves static balance by elimination of gravity forces on the drive system without counterweights, large actuators, and/or amplifiers as will be explained more fully hereinbelow.

A first rotary actuator 16, such as a motor, is mounted on the base 12. In particular the housing of actuator 16 is fixed to the base 12 while its drive shaft 18 is connected to a clevis or yoke 1 on which the arm 14 is supported. It will thus be appreciated that the arm 14 is supported on yoke 1 for pivotal movement about a vertical axis 20 responsive to actuator 16.

Yoke 1 also supports the arm 14 for pivotal movement about a horizontal axis 22. In particular, a second rotary actuator 24 which can be a motor, is provided for this purpose. The housing of actuator 24 is fixed to the yoke 1 while its drive shaft 26 is connected to the arm 14 for effecting pivotal movement thereof about the horizontal axis 22. It will thus be appreciated that arm 14 is mounted for independent pivotal movement about axes 20 and 22 responsive to actuators 16 and 24, respectively.

Actuators 16 and 24 preferably comprise high torque, low speed, brush-less AC synchronous motors. For example, such motors are commercially available from Powertron of Pittsburgh, Pa., as well as other sources.

The arm 14 comprises a four-bar linkage including links 2, 3, 4 and 5. The base link 2 is pivotally connected to the yoke 1 for pivotal movement about axis 22 responsive to actuator 24. Arm 14 is thus pivotal with respect to yoke 1, which is pivotal/rotatable relative to the base 12. The input link 5 is coupled between one end of the base link 2 and the adjacent end of the connecting link 4. The output link 3 is coupled between the other ends of links 2 and 4. The output link 3 is pivotally supported in a clevis 28 at the other end of link 2, but controlled by link 4. Pivotal movement of the output link 3 is a function of the positions of the input link 5 and connecting link 4. Links 2, 3 and 4 are preferably tubular members of graphite epoxy composite material.

A suitable end effector (not shown) is connected to the terminal end of output link 3. For example, an active compliant end effector like that shown in my co-pending application Ser. No. 031,679 filed Mar. 30, 1987, can be used.

Pivotal movement of the input link 5 is controlled by another rotary actuator 30 which is mounted on one end of base link 2. In particular, the housing of actuator 30 is fixed to link 2, while its drive shaft 32 is connected to one end of link 5. Actuator 30 preferably comprises an electric motor similar to that used for actuators 16 and 24.

The arm 14 is supported and driven in a way which eliminates the gravity terms of its components from the dynamic equations. Axes 20 and 22 are positioned to intersect at the center of gravity of the arm 14, which can be located by conventional analysis. The horizontal axis 22 lies generally in the plane of arm 14. The center of gravity of arm 14 lies along axis 20 within the plane of the arm and coaxial with the drive shaft 18 of motor 16. As a result, the drive system of robot 10 does not experience any static loads.

This comprises a critical feature of the invention. This balanced mechanism eliminates the need for extra counterbalance weights and provides the following advantages. Since motors 16, 24 and 30 are never affected by gravity factors of arm 14, the static load will be zero with little or no overheating. This in turn means that smaller actuators or motors with lower torque ratings and thus smaller amplifiers can be used to achieve the desired acceleration. Similarly, better accuracy can be obtained because the links of the arm 14 have a constant deflection. This also provides better repeatability for fine manipulation tasks.

The anaylsis is as follows. The coordinate frame $X_1Y_1Z_1$ has been assigned to the yoke 1 of the robot for $I=1, 2, 3, 4$ and 5. The center of the coordinate frame $X_1Y_1Z_1$ corresponding to yoke 16 is located at point 0 as shown in FIG. 2. The center of the inertial global coordinate frame (not shown) $X_0Y_0Z_0$ is also located at the arm's center of gravity, point 0. The joint angles are represented by the angles $\theta_1$, $\theta_2$ and $\theta_3$. The angle $\theta_1$ represents rotation of the yoke 1 and arm 14 about the vertical axis 20. The angle $\theta_2$ represents the pitch angle of the arm 14 about the horizontal axis 22. The angle $\theta_3$ represents the angle between links 2 and 3. In the following analysis, yoke 1 corresponds to link 1 with links 2–5 corresponding to the numbered links of arm 14. Motor 3 corresponds to actuator 30. The conditions under which the gravity terms are eliminated from the dynamic equations are as follows.

Figure 4:
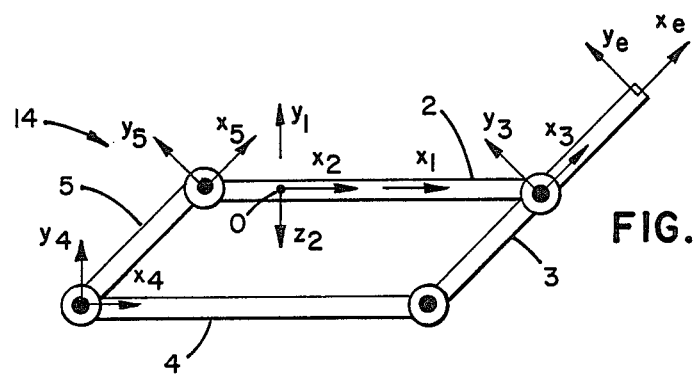
FIGS. 4 and 5 are diagrams of the four bar linkage with assigned coordinate frames.
Figure 5:
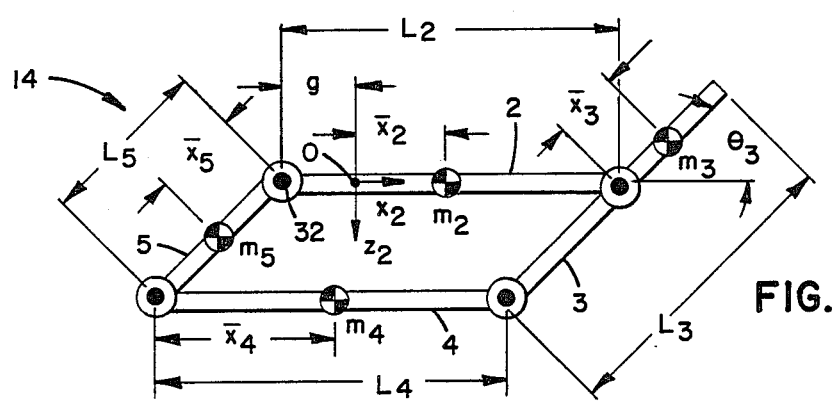

FIGS. 4 and 5 show the four bar linkage of arm 14 with assigned coordinate frames. By inspection, the conditions under which the vector of gravity passes through point 0, which is the origin or center of gravity, for all possible values of $\theta_1$ and $\theta_3$ are given by the following two equations.

$$[m_3\bar{x}_3 - m_4 l_5 - m_5\bar{x}_5]\sin\theta_3 = 0$$

$$g[m_{t3}+m_5] - m_2\bar{x}_2 - m_3[l_2-g] - m_4[\bar{x}_4-g] - [m_3\bar{x}_3 - m_4 l_5 - m_5 x_5]\cos\theta_3 = 0$$

where:
- $m_i$ = mass of each link,
- $l_i$ = length of each link,
- $\bar{x}_i$ = the distance of center of mass from the origin of each coordinate frame, $m_{t3}$ = mass of motor 3.

These equations result in the following:

$$m_3\bar{x}_3 - m_4 l_5 - m_5\bar{x}_5 = 0$$

$$g[m_{t3}+m_5] - m_2\bar{x}_2 - m_3[l_2-g] - m_4[\bar{x}_4-g] = 0$$

If the last two equations are satisfied, then the center of gravity of the arm 14 passes through point 0 for all of the possible configurations of the arm. Note that the gravity force still passes through 0 even if the plane of the arm 14 is pivoted by motor 24 about the horizontal axis 22 for all values of $\theta_2$.

From the foregoing, it will thus be apparent that the present invention comprises a statically-balanced direct drive robot arm having several advantages over the prior art. The primary advantage is that the particular configuration, mounting and drive of the arm eliminates the gravity factor without counterweights in order to achieve better response. The mechanism herein results in closed-form solutions for dynamics and inverse kinematics. Better accuracy and repeatability can be attained within a relatively large workspace. The arm herein lends itself well to adaptive electronic compliance/impedance control at the robot. Other advantages will be evident to those skilled in the art.

Although particular embodiment of the invention have been illustrated in the accompanying Drawings and described in the foregoing Detailed Description, it will be understood that the invention is not limited only to the embodiments disclosed, but is intended to embrace any alternatives, equivalents, modifications and/or rearrangements of elements falling within the scope of the invention as defined by the following claims.

I claim:

1. A statically-balanced robot arm, which comprises:
   a four-bar linkage having base, input, connecting, and output links;
   first drive means mounted on the base link for effecting pivotal movement of the input link of said linkage;
   said linkage and said first drive means having a predetermined center of gravity;
   means for supporting said linkage for independent pivotal movement about generally vertical and horizontal axes, said axes intersecting at said center of gravity; and
   second drive means for effecting independent pivotal movement of said linkage about the vertical and horizontal axes.

2. The robot arm of claim 1, wherein said first drive means comprises an electric motor having a housing and a drive shaft, the housing being fixed to the base link and the drive shaft being connected in rotatable driving engagement to the input link of said linkage.

3. The robot arm of claim 1, wherein the base, connecting and output links of said linkage are at least partially of tubular construction.

4. The robot arm of claim 1, wherein said supporting means comprises a clevis.

5. The robot arm of claim 1, wherein said second drive means comprises separate electric motors each having a housing and a drive shaft, the housing of one motor being fixed to said supporting means with its drive shaft connected in rotatable driving engagement about the horizontal axis with the base link of said linkage, and the drive shaft of the other motor being connected in rotatable driving engagement about the vertical axis to said supporting means.

6. A statically-balanced robot arm, which comprises:
- a four-bar linkage having base, input, connecting, and output links;
- control drive means mounted on the base link for effecting pivotal movement of the output link of said linkage;
- said linkage and said control drive means having a predetermined center of gravity;
- means for supporting said linkage for independent pivotal movement about generally vertical and horizontal axes, said axes intersecting at the said center of gravity;
- first drive means mounted on said supporting means for effecting pivotal movement of said linkage about the said horizontal axis; and
- second drive means for effecting pivotal movement of said supporting means about the said vertical 7. The robot arm of claim 6, wherein said horizontal axis lies generally in the plane of said linkage.

8. A statically-balanced robot arm, comprising:
- a four-bar linkage having base, input, connecting, and output links;
- a first drive motor having a housing and a drive shaft, the housing being mounted on the base link and the shaft being drivingly connected to the input link of said linkage;
- said linkage and said first drive motor having a predetermined center of gravity;
- means for supporting said linkage for independent pivotal movement about intersecting perpendicular axes, said axes intersecting at the said center of gravity;
- a second drive motor having a housing and a drive shaft, the housing being mounted on said supporting means and the shaft being connected directly to the base link of said linkage for selective rotatable movement about one of said axes; and
- a third drive motor having a housing and a rotatable drive shaft, the drive shaft being connected directly to said supporting means for selective pivotal movement about the other one of said perpendicular axes.

9. The robot arm of claim 8, wherein said horizontal axis lies generally in the plane of said linkage.

* * * * *